United States Patent [19]

Clark et al.

[11] Patent Number: 4,861,410
[45] Date of Patent: Aug. 29, 1989

[54] METHOD OF JOINING METAL OXIDE CONTAINING CERAMIC BODIES

[75] Inventors: David E. Clark; Robert H. Krabill, both of Gainesville, Fla.

[73] Assignee: University of Florida, Gainesville, Fla.

[21] Appl. No.: 5,293

[22] Filed: Jan. 16, 1987

Related U.S. Application Data

[63] Continuation of Ser. No. 704,970, Feb. 25, 1985, abandoned.

[51] Int. Cl.[4] .......................... C03B 29/00; C09J 1/00; C09J 5/06
[52] U.S. Cl. .................................... 156/325; 106/104; 156/89; 206/524.1; 252/315.7; 264/36; 501/12
[58] Field of Search .................... 264/36; 156/89, 325; 106/104; 252/313.1, 315.7; 501/12

[56] References Cited

U.S. PATENT DOCUMENTS

| | | | |
|---|---|---|---|
| 2,085,129 | 6/1937 | Stoewener | 252/315.7 |
| 2,590,833 | 4/1952 | Bechtold et al. | 252/313.1 |
| 3,287,476 | 11/1966 | Snyder | 264/36 |
| 4,397,666 | 8/1983 | Mishima et al. | 501/12 X |

FOREIGN PATENT DOCUMENTS

| | | | |
|---|---|---|---|
| 0102875 | 6/1984 | Japan | 106/104 |
| 0621655 | 8/1978 | U.S.S.R. | 106/104 |

OTHER PUBLICATIONS

Yoldas: "Alumina Gels That Form Porous Transparent $Al_2O_3$", *Journal of Materials Science*, vol. 10, No. 11, Nov. 1975, pp. 1856-1860.

Primary Examiner—Richard D. Lovering
Attorney, Agent, or Firm—Fleit, Jacobson, Cohn, Price, Holman & Stern

[57] ABSTRACT

A method of repairing or joining a metal oxide, such as $Al_2O_3$, containing ceramic bodies, fired or unfired by preparing a sol from a precursor of the metal oxide, mixing with a gelling agent, $Al(NO_3)_3$, to form a paste, optionally adding a reinforcement of SiC particulate and heating at an elevated temperature, and a repair kit.

4 Claims, 2 Drawing Sheets

(A) PULL APART → 1) REJOIN WITH SOL AND GELLING AGENT 2) HEAT →

(B)

JOIN WITH SOL AND GELLING AGENT →

FIRED TO 600°C → PULL APART → 1) REJOIN WITH SOL AND GELLING AGENT 2) FIRE TO 825°C →

METHOD OF JOINING METAL OXIDE CONTAINING CERAMIC BODIES

This application is a continuation of application Ser. No. 704,970, filed Feb. 25, 1985 now abandoned

BACKGROUND OF INVENTION

This invention relates to a unique method for repairing or joining ceramics either as green bodies or fired bodies and to novel products.

DESCRIPTION OF PRIOR ART

A need exists to repair defects, blemishes, cracks, etc., in ceramics that result in a decrease in performance, renders them useless or affects their aesthetic properties. A need also exists to permanently join together two or more ceramic structures. Although the method of this invention is suitable for fired as well as pre-fired (i.e. green) ceramics, the invention has special applicability, for repairing and joining prefired ceramics or green bodies.

It is well known in the ceramic field that major defects which are present in a pre-fired ceramic are not eliminated during firing to high temperatures. The most usual course of action taken when such a defect is detected in the green ceramic is to either discard the material and absorb the cost, or to recycle the material if possible.

The method of the present invention overcomes this problem in the art by providing a technique for repairing defects in greenware and thus, eliminates the time consuming and costly procedures of discarding or recycling.

SUMMARY OF THE INVENTION

The novel method of the present invention accomplishes the above by utilizing a gel or sol of like material to that being repaired or joined, e.g., if $Al_2O_3$ is the material to be repaired or joined, a gel or sol of $Al_2O_3$ is prepared and used to fill a crack or impregnate into a defect to fill same. For joining, the sol or gel is used to impregnate the surfaces to be joined and then the surfaces are pressed together. In either case, the repaired or joined article(s) are then heated to a suitable temperature to promote gelling first if a sol is used and then to an elevated temperature to densify the gel to its density limit.

DETAILED DESCRIPTION OF PREFERRED EMBODIMENT

Figure 1:
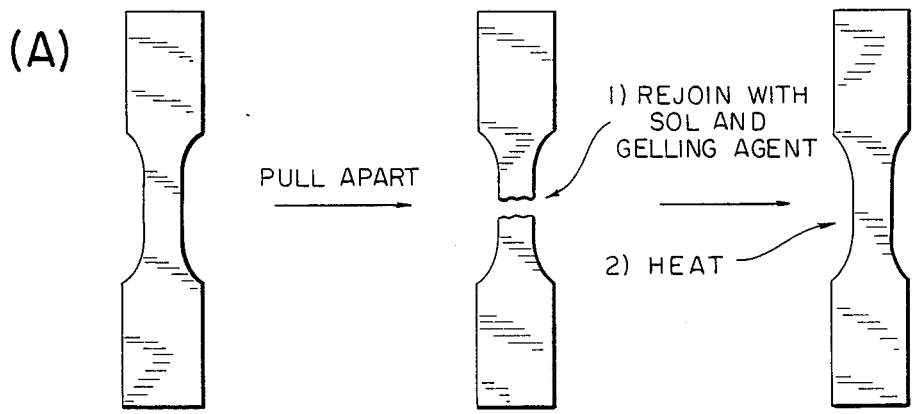
FIG. 1(a) shows schematically an unfired $Al_2O_3$ green body pulled apart and rejoined using an $Al_2O_3$ sol.
FIG. 1(b) shows schematically two unfired $Al_2O_3$ green bodies in the form of bars being joined in overlapping relationship using an $Al_2O_3$ sol.
Figure 1:
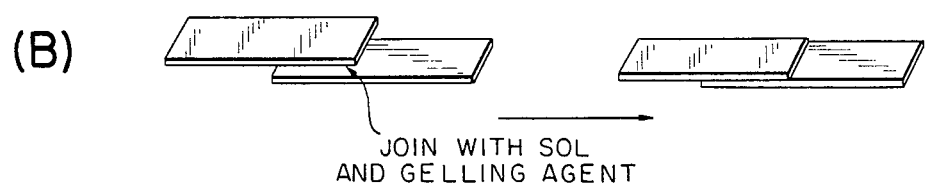

First, the development of the invention using a gel will be explained in detail. As already noted, the invention has application with both fired and unfired (green) ceramics such as $Al_2O_3$, $SiO_2$, MgO, $ZrO_2$ $Y_2O_3$ and mixtures of these compounds. Also, the ceramic, especially $Al_2O_3$, may contain a reinforcement such as C, $SiO_2$ $Al_2O_3$, $ZrO_2$, $Y_2O_3$ and MgO in the form of fibers, whiskers or powders.

For purposes of illustration, a green body $Al_2O_3$ with a crack as a defect will be considered. The material used in the invention is preferably a sol of the same material that is undergoing repair, in this case, an $Al_2O_3$ sol. The sol can be prepared by any known method such as the ones disclosed in copending applications Ser. Nos. 583,737 (now abandoned); 583,738 (now abandoned); 583,743 (now abandoned); and 583,745 (now abandoned), all filed Feb. 27, 1983. The low viscosity of the sol permits good application to the area being repaired. In addition, the low viscosity of the sol ensures that the crack or other type of defect is completely filled at the molecular level. This is in contrast to other types of ceramic fillers and repair materials comprised of micro-sized powders in a liquid suspension. These materials cannot fill cracks that are smaller than the powder particle size.

Once the sol has penetrated and filled the crack, it is necessary to promote gelation to ensure that the repair material remains in place. This can be accomplished in several ways: (1) low temperature heating of the repaired area, or (2) addition of a gelling agent such as $Al(NO_3)_3$, $Mg(NO_3)_2$ or other salts, provided that during firing everything is driven off except a metal oxide which should correspond to and match the ceramic metal oxide. From about 0.1–5% by weight of the gelling agent can be used, based on the weight of the metal oxide base of the sol.

Sol gels can be prepared with a wide range of compositions. This makes it possible to "tailor" a sol-gel for a specific application. For example, for an alumina ceramic required repairing, a sol gel alumina would be used. This procedure would insure that the repaired areas would exhibit the same properties as the rest of the ceramic material and the repaired area would not alter or affect the performance of the ceramic material.

This invention involves the joining and repair of prefired and fired ceramics via sol-gel technology with the aid of a gelling agent. Alumina sol is produced by hydrolysis and polymerization of aluminum alkoxides. Any known procedure can be used, such as, the procedures described in copending applications, Ser. Nos. 583,737; 583,738; 583,743; and 583,745, here incorporated by reference. The desired volume fraction (about 30 volume of reinforcement, such as SiC whiskers is incorporated into the sol, and 2% by weight of the gelling agent $Al(NO_3)_3$ is then added immediately prior to gelation. The gelling agent accelerates the gelation process, and improves the homogeneity of SiC whisker distribution in the sol. If the gelling agent is added in the proper proportions (from about 0.1–5% by weight based on the metal oxide base of the sol), the sol is converted into a paste which is suitable for bonding or rejoining broken ceramic parts.

Prefired ceramics were manufactured in the form of tensile specimens (FIG. 1a) and pulled apart in order for breakage to occur in the gauge section. The $Al_2O_3$ sol gelling agent paste prepared as above described was applied to the fracture surfaces and the two ends were rejoined with the aid of a heat gun by heating to an elevated temperature of between 80° C. and 250° C. The green specimens showed that good adhesion of the broken parts can be obtained with the application of the paste at a temperature which would allow fusion to occur.

Prefired ceramics were also produced in the shape of rectangular bars in order to demonstrate the bonding properties of the paste. Bars were joined as shown in FIG. 1b after the sol-gelling agent paste was applied and the joint heated to an elevated temperature as aforesaid. Good adhesion was observed between the joined parts.

Figure 2:
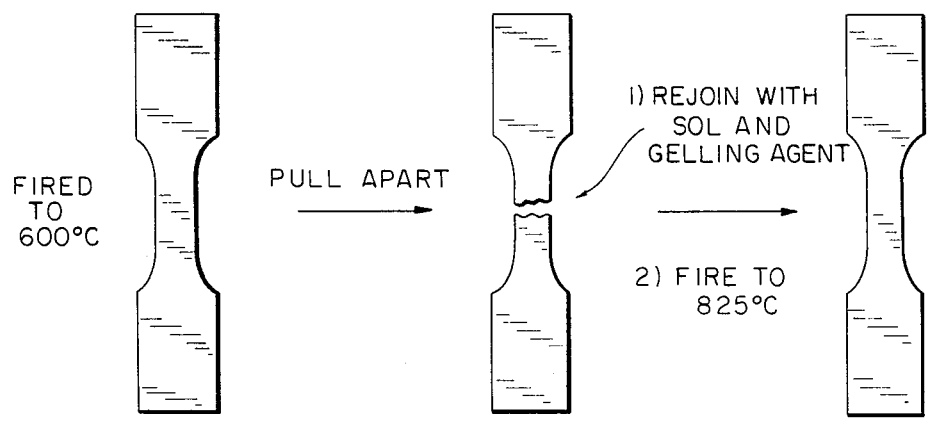
FIG. 2 shows schematically a fired $Al_2O_3$ ceramic body that has been pulled apart and rejoined with an $Al_2O_3$ sol incorporating a gelling agent.

Fired ceramics also in the shape of tensile specimens (FIG. 2) were pulled apart in the same fashion as with the prefired specimens. The sol-gelling agent paste was applied to the fracture ends, which were rejoined with the aid of a heat gun and subsequently fired to over 800° C. The fired specimens retained their integrity during the firing process, showing no more shrinkage in the joined area than in the rest of the sample. No cracks were observed at the joint.

Figure 3:
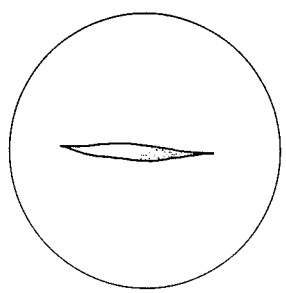
FIG. 3 shows schematically an unfired $Al_2O_3$ green body with a crack that has been blunted at one end (sharp tip) and partially filled in using an $Al_2O_3$ sol.

Repair was also performed on ceramic parts which contained small flaws, as shown in FIG. 3. These flaws or cracks can be blunted by using the alumina sol/gelling agent paste, which is applied to the existing crack with a blade or injected by means of a syringe into the areas surrounding the crack. Since the paste is in a liquid form, it can more readily infiltrate the area around the crack tip and thus inhibit any further crack propagation. The samples in FIG. 3 indicate that application of the paste inhibits crack propagation.

The present invention can be made available in kit form requiring two parts: (1) sol and (2) gelling agent. This concept has been successfully used for marketing epoxies. To use, the two parts are simply mixed together prior to their application. The ratio in which they are mixed, from about 99.9 parts by weight sol to 0.1 part by weight gelling agent to about 95 parts by weight sol and 5 parts by weight gelling agent, will determine the amount of time that the user has to work with them prior to gelation.

It should also be appreciated that the sol gels of the present invention can be used at high temperatures greater than 1000° C. whereas epoxies fail at temperatures below 500° C.

Having now fully described the invention in detail, it will be appreciated by one of ordinary skill in the art that changes and modifications can be made that do not depart from the spirit and scope of the invention set forth herein.

What is claimed is:

1. A method of joining two metal oxide containing ceramics bodies, said two ceramic bodies containing the same metal oxide, said method comprising the steps of preparing a sol from an alkoxide of the metal in said metal oxide containing ceramic bodies; mixing said sol with a gelling agent to form a paste; applying said paste to a surface of one of the ceramic bodies; and joining the two ceramic bodies by contacting the surface having said paste thereon with a surface of the other ceramic body and then heating at an elevated temperature.

2. The method of claim 1 wherein the ceramic bodies contain $Al_2O_3$.

3. The method of claim 1 wherein the ceramic bodies are unfired.

4. The method of claim 2 wherein the gelling agent is $Al(NO_3)_3$.

* * * * *